United States Patent
Shi

(10) Patent No.: US 7,499,034 B2
(45) Date of Patent: *Mar. 3, 2009

(54) ELECTRONIC WHITEBOARD HAVING FLEXIBILITY MEMBRANE ELECTROMAGNET INDUCTION GENERATING DEVICE

(75) Inventor: Xuanming Shi, Chungli (CN)

(73) Assignee: Taiguen Technology (Shen_Zhen) Co., Ltd., Shenzhen (CN)

( * ) Notice: Subject to any disclaimer, the term of this patent is extended or adjusted under 35 U.S.C. 154(b) by 183 days.

This patent is subject to a terminal disclaimer.

(21) Appl. No.: 10/500,479

(22) PCT Filed: Aug. 2, 2002

(86) PCT No.: PCT/CN02/00533

§ 371 (c)(1),
(2), (4) Date: Mar. 25, 2005

(87) PCT Pub. No.: WO03/056417

PCT Pub. Date: Jul. 10, 2003

(65) Prior Publication Data

US 2005/0211476 A1 Sep. 29, 2005

(30) Foreign Application Priority Data

Dec. 29, 2001 (CN) .................. 01 2 79677

(51) Int. Cl.
*G06K 11/16* (2006.01)
(52) U.S. Cl. ...................... 345/173; 345/177
(58) Field of Classification Search .......... 345/173, 345/177
See application file for complete search history.

(56) References Cited

U.S. PATENT DOCUMENTS

| | | | | |
|---|---|---|---|---|
| 6,078,274 A * | 6/2000 | Inou | ........................... | 341/34 |
| 7,091,909 B2* | 8/2006 | Nakano et al. | ........ | 343/700 MS |
| 7,268,771 B2* | 9/2007 | Shi et al. | .................... | 345/173 |
| 2001/0055005 A1* | 12/2001 | Teterwak | .................... | 345/173 |
| 2002/0008692 A1* | 1/2002 | Omura et al. | ............... | 345/173 |
| 2002/0074171 A1* | 6/2002 | Nakano et al. | ........... | 178/18.01 |
| 2002/0135568 A1* | 9/2002 | Chen | .......................... | 345/173 |
| 2004/0239642 A1* | 12/2004 | Shi et al. | .................... | 345/173 |
| 2005/0062725 A1* | 3/2005 | Shih | ........................... | 345/173 |
| 2005/0062775 A1* | 3/2005 | Suzuki et al. | ................. | 347/12 |

\* cited by examiner

*Primary Examiner*—Bipin Shalwala
*Assistant Examiner*—Afroza Y Chowdhury
(74) *Attorney, Agent, or Firm*—Hogan & Hartson LLP

(57) ABSTRACT

An electronic whiteboard having flexible membrane electromagnetic generating device, at least including an electronic whiteboard main unit having an input induction section, a recognition controlling circuit, a signal output device inside, a writing layer as surface, a bottom layer as casing body, and a frame around, and an input pen. Wherein the induction section is composed of a covering layer, an electromagnetic induction generating layer and a bottom support bracket layer, wherein the base layer of the electromagnetic induction generating layer is an insulated flexible membrane, the surfaces of which are printed with an electromagnetic induction receiving antenna array, and a flexible membrane electromagnetic induction generating layer is constituted, the output of that layer is connected to the recognition controlling circuit, and the input pen has an electromagnetic wave generating device. The present invention has a simple manufacturing technique, greatly reduces the cost of an electronic whiteboard, and increases the precision of induction greatly.

6 Claims, 3 Drawing Sheets

ELECTRONIC WHITEBOARD HAVING FLEXIBILITY MEMBRANE ELECTROMAGNET INDUCTION GENERATING DEVICE

This application is a 371 of PCT/CN02/00533 Aug. 2, 2002.

FIELD OF TECHNOLOGY

The present invention relates to an electronic whiteboard, and in particular it relates to an electronic whiteboard having flexible membrane electromagnetic induction generating device with low cost, simple manufacturing technique and high recognition precision. It belongs to the field of electronic technologies.

BACKGROUND TECHNOLOGY

As the consequence of the development of electronic technology, no matter on school lectures or during department seminars, electronic whiteboards are used more and more widely. This kind of product is able to convert symbols written on the whiteboard to electronic signals in time, and transmits the electronic signals to the connected computer, then completes teledata communication, such as editing data, printing data, transmitting data, etc., directly by the computer. Because the induction area is relatively large, now the existing electronic whiteboard neither can be made, for example, the electromagnetic induction type made by means of printed circuit board erosion; nor can use the resistance induction configuration as the touch screen, thereby the electronic whiteboard cannot determine the location where the instruction occurs and move cursor by using resistance induction generating device or inductance induction generating device, etc., as hand-writing panel, but by using the method of supersonic transmission and reception between input pen and whiteboard to control, while it is still high cost, which limits the application of this kind of product widely. Therefore, the existing products have problems such as obviously low recognition rate, low precision, high cost, and difficulty in manufacture, etc.

SUMMARY OF THE INVENTION

The purpose of the present invention is to overcome the disadvantages of the prior art, and to provide an electronic whiteboard having flexible membrane electromagnetic induction generating device, which has low cost, simple manufacturing technique, high precision for data collection and recognition.

Another purpose of the present invention is to provide an electronic whiteboard having flexible membrane electromagnetic induction generating device having long operating life and easy maintenance.

The purpose of the present invention is realized thus: An electronic whiteboard having flexible membrane electromagnetic induction generating device, at least including an electronic whiteboard main unit having an input induction section, a recognition controlling circuit, a signal output device inside, a writing layer as surface, a bottom layer as casing body, and a frame around, and an input pen. Wherein the induction section is composed of a covering layer, an electromagnetic induction generating layer and a bottom support bracket layer, wherein the base layer of the electromagnetic induction generating layer is an insulated flexible membrane, the surfaces of which are printed with an electromagnetic induction receiving antenna array, and a flexible membrane electromagnetic induction generating layer is constituted, the output of that layer is connected to the recognition controlling circuit, and the input pen has an electromagnetic wave generating device.

The recognition controlling circuit is set on a PCB (printed circuit board), because the materials are different, the section where the controlling circuit is set is separated with the induction section physically, thereby the antenna's output port of the flexible membrane electromagnetic induction generating layer is spliced or plugged or welded to the corresponding input pin on the PCB (printed circuit board).

Concretely, the electromagnetic induction receiving antenna array is induction antenna cells distributed along X axis and Y axis. The induction antenna cells are annular or linear.

The induction antenna cells are printed on the two sides of the membrane surfaces respectively. According to needs, one layer or more than one layer of induction antenna cells along X axis and Y axis are printed on the two sides of the membrane surfaces and the layers are insulated from each other; in case of more than one layer of induction antenna cells, the intervals between the induction antenna cells of each layer can be uniform or different.

The induction antenna cell is silver paste material or mixture material of silver paste and carbon paste.

In order to guarantee signals, a shielding layer can be provided behind the electromagnetic induction generating layer.

In order to raise accuracy of inducting signals' location, a pressure sensor along Z axis can be provided behind the tip of the input pen, and the output of the sensor is connected to the control port of electromagnetic wave generating device, thus electromagnetic wave transmitting signals are changed by pressing in contact, and the input signal can be recognized more precisely.

Said signal output device is a cable connecting device or a wireless data communicating device. The cable connecting device is a USB joint device; the wireless data communicating device is a radio-frequency transceiver.

In order to reduce cost and to make manufacture easier, the membrane can be film material.

According to the technological scheme described above, the present invention has simple and rational configuration and simple manufacturing technique, greatly reduces the cost of electronic whiteboard, and enhances the induction precision greatly.

EMBODIMENTS

The present invention is explained in further detail below together with the attached drawings and concrete embodiments.

Figure 1:
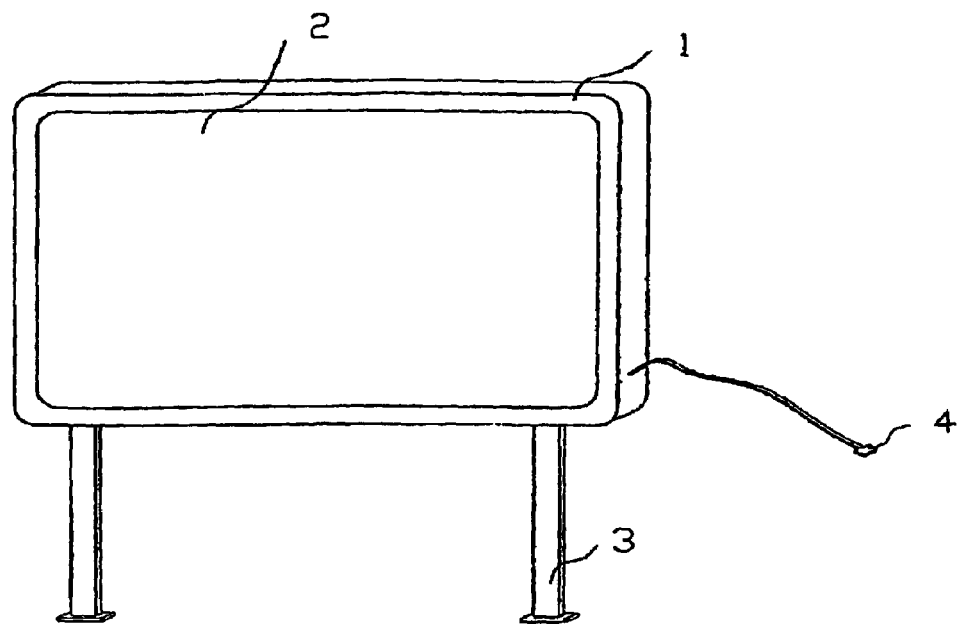
FIG. 1 is a schematic drawing of the three-dimensional configuration of the present invention.
Figure 5:
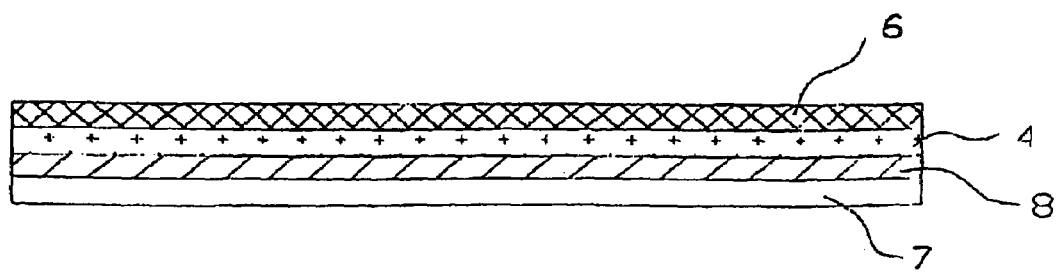
FIG. 5 is a schematic drawing of hiberarchy configuration of induction section of the present invention.

Referring to FIGS. 1 and 5, which are the schematic drawings of three-dimensional structure of the present invention, the main unit of the electronic whiteboard is comprised of a writing layer as surface, a bottom support bracket layer 7 as casing body. There are an input induction section 2, a recognition controlling circuit and a signal output device between the surface and the bottom layer. The main unit also includes a frame 1 around and a bracket 3, of course, and an input pen is included.

Figure 2:
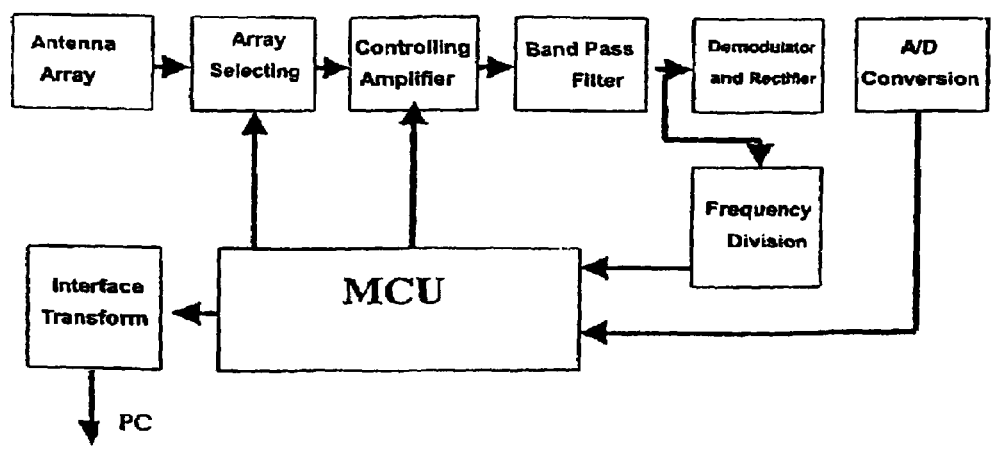
FIG. 2 is a block diagram of circuit configuration of the present invention.

Concretely, as shown in FIGS. 1 and 2, the present invent is an electronic whiteboard having flexible membrane electromagnetic induction generating device; it completes the signal collection and input by means of electromagnetic induction. Its induction circuit section is constituted with an input induction section, a recognition controlling circuit, a signal output device, and an electromagnetic input pen having an electromagnetic generating device.

Figure 3:
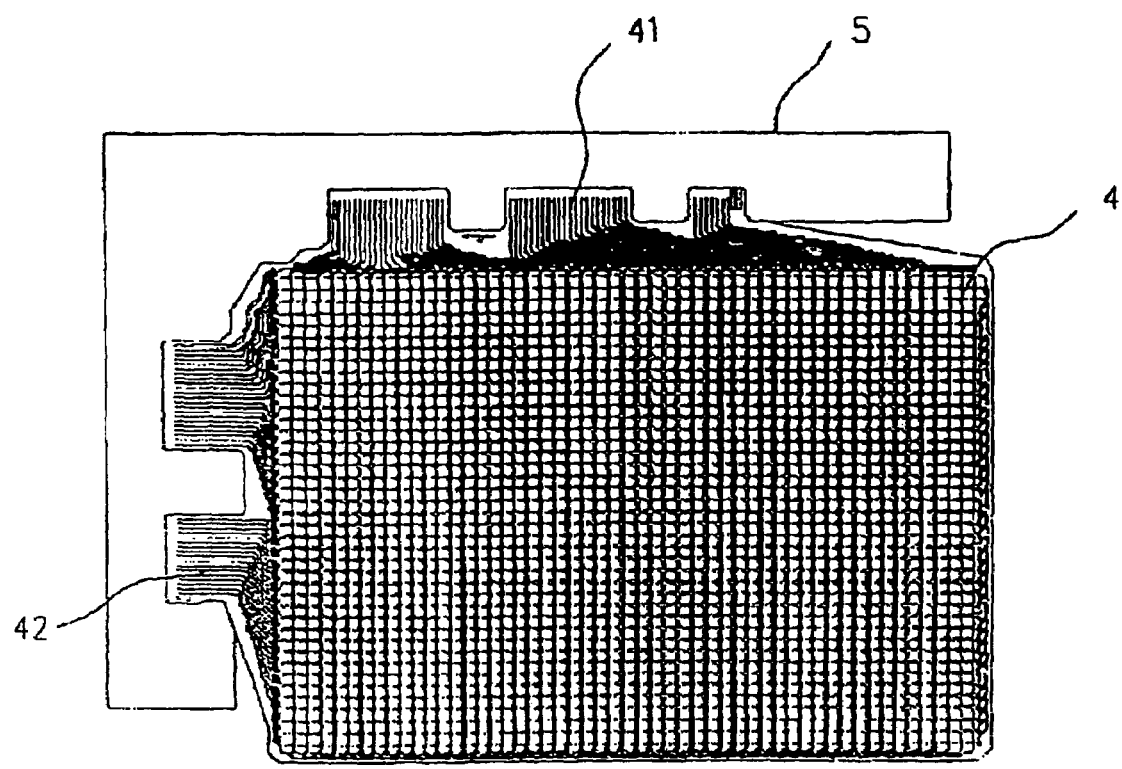
FIG. 3 is a schematic drawing of embodiment of double-sided set induction array of the present invention.
Figure 4:
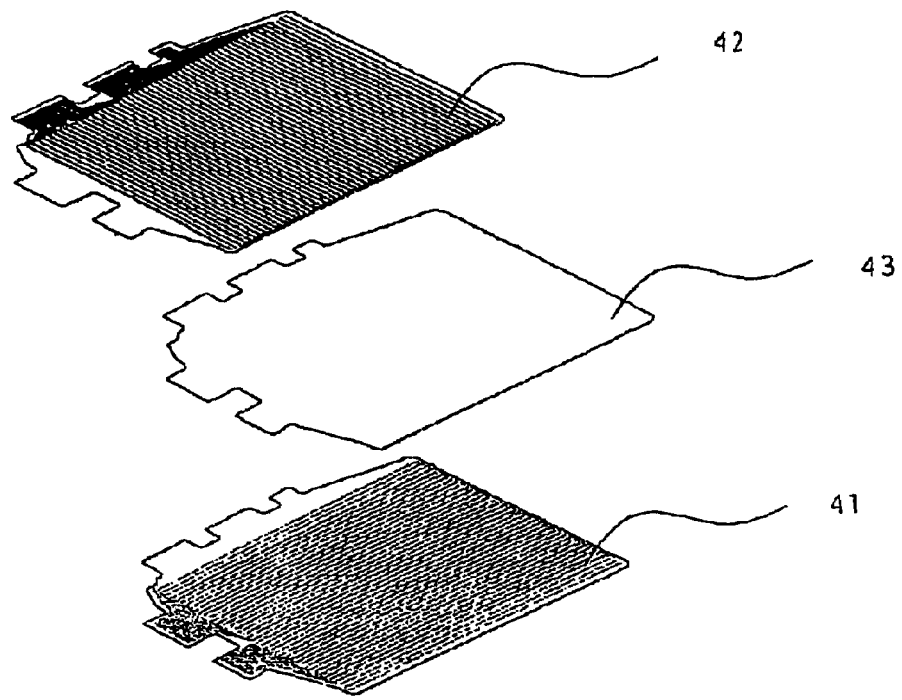
FIG. 4 is a schematic drawing of three-dimensional decomposed structure of embodiment of many layers of induction array set one-sided of the present invention.

As shown in FIGS. 3, 4 and 5, wherein the induction section is constituted with a covering layer 6, an electromagnetic induction generating layer 4 and a bottom support bracket layer 7, on occasion, in order to ensure signals, a shielding layer 8 is provided between the electromagnetic induction generating layer 4 and the bottom support bracket layer 7. Wherein, the base layer of the electromagnetic induction generating layer 4 is an insulated flexible membrane 43, on whose surface the electromagnetic induction receiving antenna arrays 41, 42 are printed, composing the flexible membrane electromagnetic induction generating layer 4. The induction antenna cell, which is distributed with array, is annular or line. And the cell is printed crosswise, distributed following X axis and Y axis, on the two sides of the membrane surface. For example, the horizontal direction of the bottom layer follows X axis, and the vertical direction of the top layer follows Y axis, therefore a 2-D coordinate system is established on the induction section. Of course, in order to increase induction precision, more than one layer of induction antenna cells along X axis and Y axis are printed on the two sides of the membrane surface respectively and the layers are insulated from each layer. The intervals between the antenna cells of each layer are different, after piling up the big and the small, consequentially the coordinate intervals can be reduced, so that recognition precision increases. In order to reduce cost and make manufacturing simple, the membrane 43 can be a common film material. The electromagnetic induction receiving antenna array is printed with silver paste or mixture of silver paste and carbon paste. The output of the electromagnetic induction receiving antenna arrays 41, 42 are connected with the recognition controlling circuit.

As shown in FIG. 3, the recognition controlling circuit is set on a PCB (printed circuit board) 5, because of the different materials, the setup section and the induction section of the controlling circuit are separated physically, thereby the antenna's output port of the flexible membrane electromagnetic induction generating layer 4 is spliced, plugged or welded to the corresponding pin of the PCB (printed circuit board) 5. In order to ease the installation and guarantee the contacting effect, it is better to choose the spliced method, and place a spring gasket at the contact surface.

Operating mechanism of the present invention is as follows:

The electromagnetic pen emits the electromagnetic signal continuously, when the pen tip touches the induction generating device, the electromagnetic signal penetrates the induction antenna at one location, the antenna at that location induces the signal, and the induction generating device transmits the induced location signal to the input of the recognition circuit via down-leads following X and Y axes, after array selecting, controlling amplifying, band pass filtering, demodulating and rectifying and A/D conversion, the signal is sent to the CPU of the processing circuit to calculate and determine the coordinates of the induction antenna where the electromagnetic signal locates and the signal's various working states, then the above information is sent to a computer via communication interface, so that to control the computer to recognize, display, record, etc.

Moreover, in order to acquire the pressure on the pen tip when writing and to increase the inducing precision of signal location, a pressure sensor along Z axis is provided behind the tip of the input pen, the output of the sensor is connected to the control port of the electromagnetic generating device. So the emitting signal of electromagnetic wave can be adjusted by pressing, thereby the pressure at the pen tip, input signal, can be recognized more precisely.

In addition, the signal output device is a cable connecting device or a wireless data communicating device. The cable connecting device is a cable having a USB joint; the wireless data communicating device is a radio-frequency transceiver. Of course, the signal output device is connected to a computer and/or a printer, and the information collected from the whiteboard is edited, printed directly; in addition, the signal output device is connected to a data storing equipment directly, and the data can be stored and inputted to a computer or other equipments by the mobile storing equipment. The signal output device and the detailed circuit structure of the peripheral equipments are the same in connection method with electronic products in other consumer field, hereby we do not elaborate any more.

The induced collected and exported data by the present invented whiteboard is the data after recognition, converted to the data of the track of the pen motion, or the unrecognized date, which is the coordinates of the pen each time.

The above embodiments are only to explain the present invention and is by no means limitation of the present invention, although referring to the above preferable embodiments explain the present invention in detail, a common technician can understand and can make revision, transformation or equivalent substitution to the present invention, and does not break away from the spirit and the scope of the present invention, and all should be covered by the claims of the present invention.

The invention claimed is:

1. An electronic whiteboard having flexible membrane electromagnetic induction generating device, including an electronic whiteboard main unit having a writing layer as surface, a bottom support bracket layer as bottom, an input induction section, a recognition controlling circuit, a signal output device inside between the said two layers and a frame around, and also including an input pen, characterized in that: said induction section is composed of a covering layer, an electromagnetic induction generating layer and a bottom support bracket layer, wherein the base layer of the electromagnetic induction generating layer is an insulated flexible membrane which can be a film material, the surfaces of membrane are printed with an electromagnetic induction receiving antenna array which is induction antenna cells distributed along X axis and Y axis, thereby a flexible membrane electromagnetic induction generating layer is constituted, the output of that electromagnetic induction generating layer is connected to the recognition controlling circuit, and the input pen has a radio signal generating device;

said signal output device is a cable connecting device which is a cable having USB joint interface or a wireless data communicating device which is a radio frequency transceiver, and said signal output device is connected to a computer and/or a printer and/or a data storing equipment directly;

said induction antenna array cells are the cells printed on the two sides of the membrane surface respectively;

more than one layer of induction antenna cells along X axis and Y axis are the cells printed on the two sides of the membrane surface and the layers are insulated from each other; and the intervals between the induction antenna cells of each layer are different for more than one layer of induction antenna cells.

2. An electronic whiteboard having flexible membrane electromagnetic induction generating device as cited in claim 1, characterized in that: said recognition controlling circuit is set on a PCB (printed circuit board), and the antenna's output port of said flexible membrane electromagnetic induction generating layer is spliced or plugged or welded to the corresponding input pin on the PCB (printed circuit board).

3. An electronic whiteboard having flexible membrane electromagnetic induction generating device as cited in claim 1, characterized in that: said induction antenna cell is silver paste material or mixture material of silver paste and carbon paste.

4. An electronic whiteboard having flexible membrane electromagnetic induction generating device as cited in claim 1, characterized in that: a shielding layer can be provided behind said electromagnetic induction generating layer to increase the anti-interference capability.

5. An electronic whiteboard having flexible membrane electromagnetic induction generating device as cited in claim 1, characterized in that: the radio signal generating device of said writing input pen is an electromagnetic wave generating device.

6. An electronic whiteboard having flexible membrane electromagnetic induction generating device as cited in claim 1, characterized in that: said radio signal generation device of the writing input pen has a RF generating or receiving device, corresponding RF receiving or generating device is provided on the whiteboard main unit.

* * * * *